H. S. HATFIELD.
ELECTROLYTIC METER.
APPLICATION FILED MAY 9, 1911.

1,048,156.

Patented Dec. 24, 1912.

Witnesses:
Paul Krüger
Richard Hahn

Inventor:
Henry Stafford Hatfield

UNITED STATES PATENT OFFICE.

HENRY STAFFORD HATFIELD, OF JENA, GERMANY, ASSIGNOR TO THE FIRM OF SCHOTT & GEN., OF JENA, GERMANY.

ELECTROLYTIC METER.

1,048,156. Specification of Letters Patent. Patented Dec. 24, 1912.

Application filed May 9, 1911. Serial No. 626,089.

*To all whom it may concern:*

Be it known that I, HENRY STAFFORD HATFIELD, a citizen of Great Britain, residing at Otto-Schott strasse, Jena, in the Grand Duchy of Saxe-Weimar, Germany, have invented a new and useful Electrolytic Meter, of which the following is a specification.

The invention relates to electrolytic electricity meters, in which an electrode liquid is employed and the measurement is carried out by the change in volume of a portion of such liquid being determined.

It consists in the meter being supplied with a special measuring vessel located above the container of the said portion, into which measuring vessel the said portion is transferred from the container by tilting the meter. Such a meter must have the whole vessel formed in such a manner that, on the container being emptied into the measuring vessel, none of the other electrode liquid of the meter is added.

Figure 1:
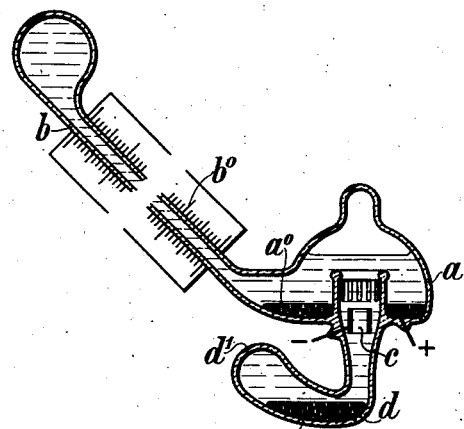
Figure 2:
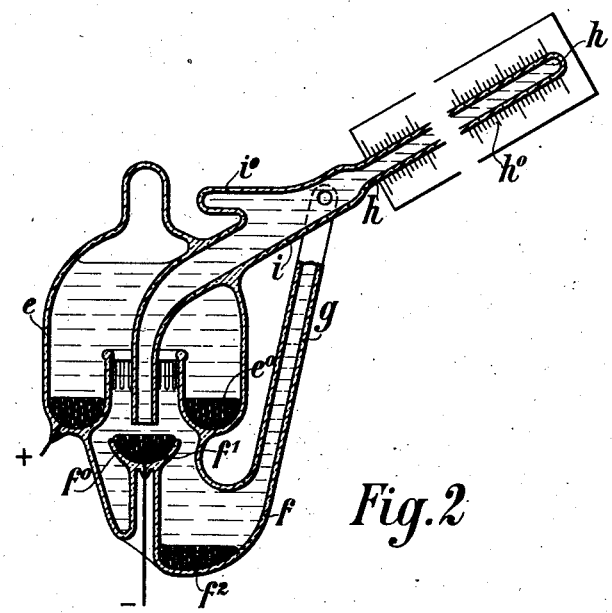

In the annexed drawing: Figure 1 is a vertical section through an electrolytic electricity meter constructed according to the invention. Fig. 2 is a vertical section through another form of such a meter.

In the example Fig. 1 the container $a$ of the liquid anode $a^0$ is connected with a measuring vessel $b$, which is furnished with a scale $b^0$. A solid body $c$ serves as cathode. The anode liquid $d^0$, which is deposited on the cathode from the electrolyte, (a solution of mercurous nitrate or any other suitable solution) accumulates in the container $d$, the lateral extension $d^1$ of which has about the same direction as the measuring vessel $b$. Let it be assumed, that the volume of the anode $a^0$ was determined, when it was still intact and there was as yet no anode liquid $d^0$ in the container $d$, i. e. before the commencement of the electrolysis. In order to again determine in the condition of the meter as shown the volume of the anode $a^0$ and in this way to ascertain its diminution as compared with the volume originally measured, the meter is rotated in a vertical plane corresponding with the plane of the drawing in the counter-clockwise direction, until the measuring vessel $b$ has assumed a vertical position. During this rotation the anode $a^0$ flows into the measuring vessel $b$, while the anode liquid $d^0$ passes into the extension $d^1$ and is thereby hindered from flowing across into the anode container $a$. After the volume has been read off on the scale, the meter may be turned back into the position shown, $a^0$ and $d^0$ flowing back in consequence to the places, in which they are shown in the figure. Should it be desired to restore the anode to its initial volume before continuing the use of the meter, the latter should be rotated in the clockwise direction, until the liquid $d^0$ has been completely run off into the anode container $a$. If the meter be then rotated back again into the position shown, it will have returned to the condition, in which the initial measurement of the volume was made.

In the second example, Fig. 2, one and the same liquid is employed an anode and cathode. The anode $e^0$ is in a container $e$, which is similar to the anode container $a$ of Fig. 1. Of the cathode there are two separate parts: the effective part $f^0$ in the cup $f^1$ and the part $f^2$, which has become ineffective by overflowing from this cup and has accumulated on the bottom of the cathode container $f$. The apparatus is fitted for measuring the volume of that portion of the total electrode liquid, which is made up of the two cathode parts $f^0$ and $f^2$, by a connecting tube $g$ leading from the bottom of the cathode container $f$ to the measuring vessel $h$, which bears the scale $h^0$. This vessel is in addition connected to the cathode container by a second tube $i$, which is taken through the anode container $e$ and has its orifice immediately above the cup $f^1$. The tube $i$ is fitted with a chamber $i^0$ on its upper side, the capacity of which should be no greater than that of the cup $f^1$. In order to carry out the measurement of the volume (the second measurement, counting the one made before starting the meter as the first one), the meter is rotated in the clockwise direction, until the measuring vessel $h$ is vertical. During this rotation the cathode part $f^0$ flows off the cup $f^1$ and combines with the part $f^2$. The cathode then passes through the tube $g$ into the measuring vessel $h$. The volume having been read off, the meter is rotated further in the clockwise direction, so that the contents of the measuring vessel, running along the tube $i$ under the orifice of the tube $g$, fill the chamber $i^0$ and the remainder flows into the cathode container $f$. If the meter be now rotated in the counter-clockwise direction, first of all the contents of the cathode container $f$ will flow into the anode container $e$, whereby the anode will be made up to approximately the amount, at which the first measurement of the cathode volume took place. Thereupon the chamber $i^0$ will empty itself through $i$ (its contents again flowing along beneath the orifice of $g$) into the measuring vessel $h$. The volume (which is to be deducted at the next measurement as the initial value) having been read off, when the measuring vessel is in the vertical position, the meter is rotated on in the counter-clockwise direction till it assumes the position shown, the measuring vessel emptying itself through the tube $i$ (its contents again flowing along beneath the orifice of $g$) into the cup $f^1$. The meter then commences the new working period with a cathode reduced to the part $f^0$.

I claim:

1. In an electrolytic electricity meter an electrode liquid, a container for a portion of the liquid, a measuring vessel, a scale applied to this vessel located above the container, a communication between the container and the vessel for the transference of the said portion from the container to the vessel by tilting the meter.

2. In an electrolytic electricity meter an anode liquid, a container for the effective portion of the said liquid, a measuring vessel located above the container, a scale applied to this vessel, a communication between the container and the vessel for the transference of the said portion from the container to the vessel by tilting the meter, another container for the ineffective portion of the said liquid and a lateral extension of this container having the same direction as the said measuring vessel.

HENRY STAFFORD HATFIELD.

Witnesses:
 PAUL KRÜGER,
 RICHARD HAHN.